United States Patent [19]

Harper et al.

[11] Patent Number: 4,888,962
[45] Date of Patent: Dec. 26, 1989

[54] SUCTION ACCUMULATOR STRAP

[75] Inventors: Harold M. Harper, Brooklyn; Mark C. Holtman, Ypsilanti, both of Mich.

[73] Assignee: Tecumseh Products Company, Tecumseh, Mich.

[21] Appl. No.: 294,306

[22] Filed: Jan. 6, 1989

[51] Int. Cl.[4] .............................................. F25B 43/00
[52] U.S. Cl. ........................................ 62/503; 62/295; 62/297; 417/540; 417/902
[58] Field of Search .......................... 62/295, 297, 503; 417/540, 902

[56] References Cited

U.S. PATENT DOCUMENTS

| 2,977,043 | 3/1961 | Scheldorf | 230/235 |
| 3,361,403 | 1/1968 | Oeler et al. | 248/205 |
| 4,133,509 | 1/1979 | Kalbow et al. | 248/313 |
| 4,379,541 | 4/1983 | Harkness | 248/544 |
| 4,429,544 | 2/1984 | Mc Carty | 62/503 |
| 4,601,179 | 7/1986 | Johansson | 62/503 |
| 4,607,503 | 8/1986 | Fry | 62/503 |
| 4,611,473 | 9/1986 | Wada et al. | 62/503 |

Primary Examiner—Ronald C. Capossela
Attorney, Agent, or Firm—Albert L. Jeffers; John F. Hoffman; Lawrence A. Steward

[57] ABSTRACT

A compressor and suction accumulator assembly wherein the suction accumulator is secured in close proximity to the compressor by way of a strap. The strap is engaged with the housing of the compressor and extends circumferentially around the accumulator casing. A spring loop is formed on the strap to establish spring tension at the engagement of the strap and the compressor housing. The spring loop has opposing sides spaced apart a predetermined distance, with each of the opposing sides having a hole disposed therein which is axially aligned with the hole in the opposite side. A screw is received in one hole and extends to the hole in the other side. Rotating the screw results in a constriction of the distance between the opposing sides of the spring. Spring tension is imparted to the strap and a tight connection is created between the accumulator and the compressor.

19 Claims, 2 Drawing Sheets

SUCTION ACCUMULATOR STRAP

BACKGROUND OF THE INVENTION

This invention relates to hermetic compressor and suction accumulator assemblies for use in refrigeration systems, and in particular, to a strap for securely fastening a suction accumulator to a hermetic compressor.

Most compressors adapted for use in refrigeration systems are designed for the compression of gaseous refrigerant. Under some circumstances, however, it is not unusual for a certain amount of liquid to flow from the evaporator into the inlet of the compressor. This condition, which is often referred to as "slugging", may occur after the system is shut down. If an accumulator is not provided, large quantities of condensed refrigerant return through the suction line to the crankcase of the compressor. When the compressor is restarted, the large quantity of liquid refrigerant present therein results in abnormally high pressures which frequently cause blown gaskets, broken valves, etc. Suction accumulators, which are well known in the art, are provided in refrigeration systems to prevent this from occurring. Such accumulators prevent liquid refrigerant from entering the compressor cylinder, and act as storage reservoirs for the liquid refrigerant. The accumulators permit the liquid refrigerant to change to its gaseous state prior to entering the compressor suction tube and the compressor cylinder.

Many prior art arrangements have been provided for mounting accumulators in refrigeration systems. In the interest of providing a compact refrigeration system, it is preferred that suction accumulators be placed in close proximity to the compressor housing. A desirable feature of a refrigeration system is that very little pressure drop occurs in the suction tube leading from the accumulator to the compressor, so that suction tube losses will not detract appreciably from the efficiency of the system. In order to prevent appreciable pressure drop in the suction tube, it is desirable that the length of this tube is kept as short as possible. Additionally, it is desired that the accumulator and compressor be positioned in a manner such that the vibration of the accumulator is kept to a minimum.

One prior art arrangement for mounting accumulators in refrigeration systems is disclosed in U.S. Pat. No. 4,607,503, which is assigned to the assignee of the present application. This patent shows a mounting bracket disposed in the area between the accumulator casing and the compressor housing, which bracket secures the casing to the housing. While this bracket provides a reliable mount for the accumulator on the compressor, it does not prevent vibration of the accumulator body to the extent desired. This vibration may cause a weakening of the mount over a period of time, and in some cases may result in cracks being formed in the accumulator tube.

Another prior art arrangement utilizes a spring steel strap that holds the accumulator in close proximity to the compressor housing by spring tension. This strap is disposed circumferentially around the accumulator casing, and is somewhat bell-shaped in the area between the compressor and the accumulator. Although this spring steel strap imparts tension to hold the accumulator in close proximity to the compressor, the vibration of the accumulator may cause a lessening of this spring tension over a period of time, which ultimately results in even further vibrations and an increased noise level. As the spring tension of the strap continues to decrease, it becomes possible for the accumulator to dislodge from its position in close proximity to the compressor. This spring steel strap generally comprises a unitary piece of metal, and does not include any means for varying the spring tension.

Other straps for mounting an accumulator casing on a compressor housing have been used. One of these comprises a U-shaped bracket affixed to the housing of the compressor. This U-shaped bracket has two outwardly extending flanges, and the accumulator is placed adjacent to the compressor and within the U. A mated bracket is placed over the accumulator in relationship with the housing bracket. This bracket is attached to the U-shaped bracket by screws positioned on each side of the accumulator which engage the housing bracket at these flanges. Although the bracket holds the accumulator near the housing, it is necessary to screw the bracket on both sides of the accumulator. In addition, this arrangement does not impart any spring tension to the assembly. Thus, it is believed that the vibration of the accumulator may eventually loosen the screws and weaken this mount, resulting in an increased noise level and possibly a cracking of the accumulator tube.

It is therefore desired to provide a mount for a hermetic compressor and accumulator assembly wherein the accumulator is firmly held in close proximity to the compressor. Also, it is desired to provide such a mount wherein the vibration of the accumulator and the noise level of the system are kept within acceptable levels.

SUMMARY OF THE INVENTION

The present invention overcomes the disadvantages of prior art compressor and accumulator assemblies by providing an improved assembly therefor.

The present invention, in one form thereof, comprises a compressor and accumulator assembly having strap means engaged with the compressor housing for holding the accumulator in closely spaced relationship with the housing. The strap means includes a spring loop formed thereon for resiliently varying the tension of the strap means so that the accumulator may be tightly held in close proximity to the compressor. In one form thereof, the spring loop comprises a loop having generally parallel sides spaced apart a predetermined distance. Each of the sides has a hole formed therein which is axially aligned with the hole in the opposing parallel side. A screw is received in one of said holes and extends to the other hole in which it is threadedly received. The screw may be adjusted to alter the distance between the opposing sides, whereby the tension of the strap may be varied.

An advantage of the assembly according to one form of the invention is that the accumulator is securely held in close proximity to the compressor.

A further advantage of the assembly is that the noise level associated with the assembly is minimized.

Yet another advantage of the assembly is that, because of the spring tension provided by the spring loop, vibration of the compressor and accumulator assembly will not loosen the mounting for the accumulator.

In one form thereof, the present invention comprises the combination of a hermetic compressor having a housing which has retaining means disposed thereon, and an accumulator having a cylindrical casing, that is positioned adjacent the housing and in closely spaced relationship therewith. Included in the combination is strap means disposed circumferentially around the accumulator casing and engaging the retaining means. The strap means has a spring loop formed thereon for establishing spring tension at the engagement of the strap means and the retaining means. The spring loop includes means for varying the spring tension, whereby the accumulator is resiliently clamped to the compressor housing.

BRIEF DESCRIPTION OF THE DRAWINGS

The above-mentioned and other features of the invention, and the manner of attaining them, will become more apparent and the invention itself will be better understood by reference to the following description of an embodiment of the invention taken in conjunction with the accompanying drawings, wherein.

DESCRIPTION OF THE PREFERRED EMBODIMENT

Figure 1:
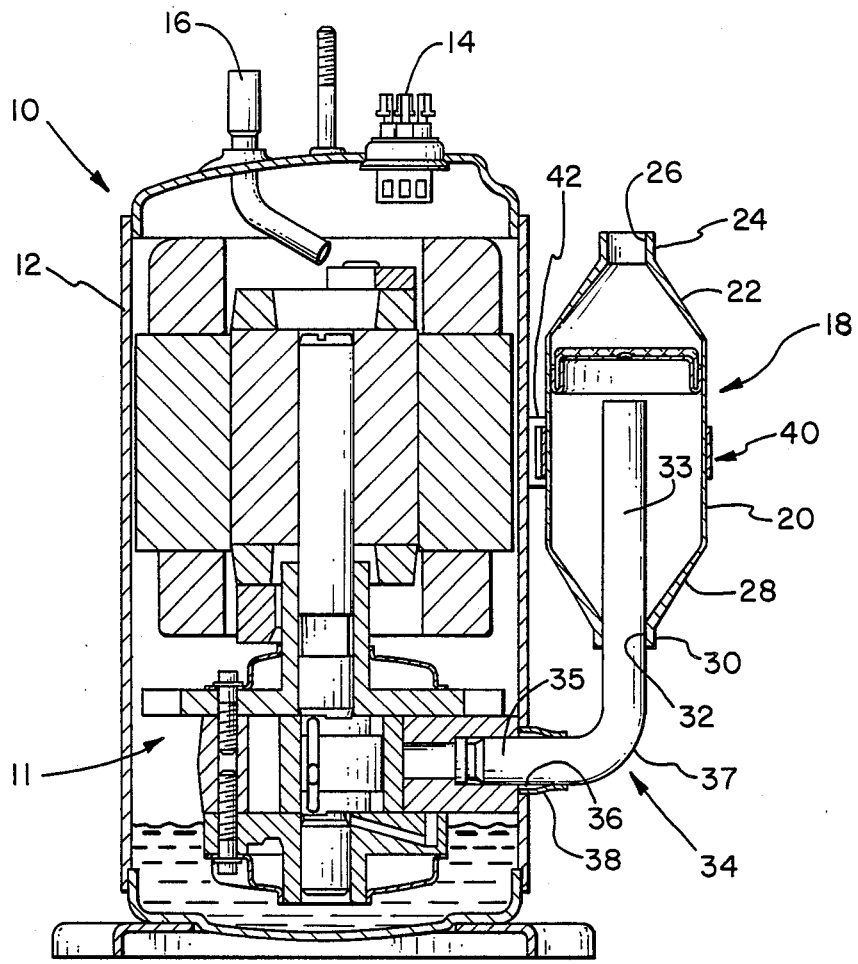
FIG. 1 is an elevational, sectional view of a hermetic compressor and suction accumulator assembly according to the present invention.
Figure 2:
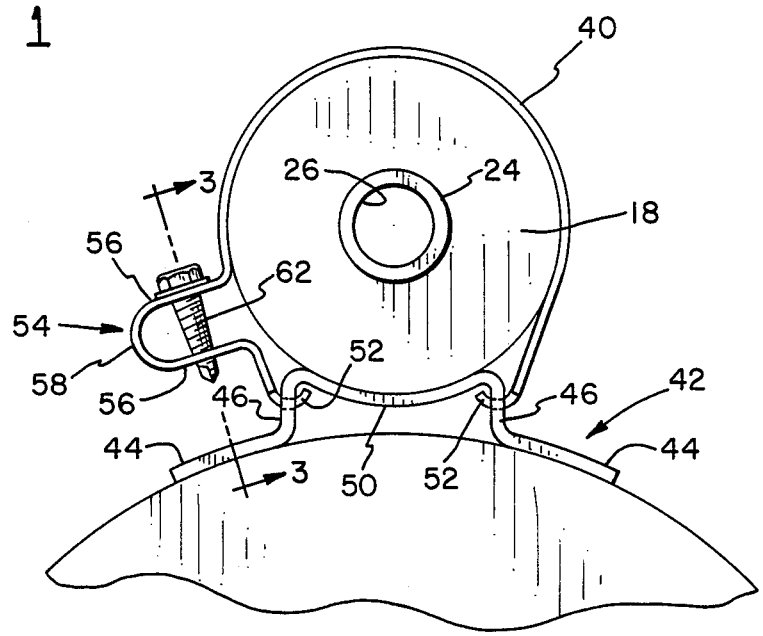
FIG. 2 is an enlarged fragmentary top plan view of the assembly according to the present invention.

Referring to FIG. 1, a rotary compressor 10 is shown that includes a motor compressor unit 11 and housing 12. Compressor housing 12 is provided with an electric terminal cluster 14 for connection with a source of electrical power, and a discharge outlet 16 adapted for connection to a condenser of the refrigeration system in a conventional manner. A suction accumulator 18 is positioned adjacent compressor 10 and includes accumulator casing 20, which is preferably cylindrical in shape, as best seen in FIG. 2. Accumulator 18, in one form, includes conical end wall 22. End wall 22 has a tubular portion 24 including an inlet aperture 26 for connection with the evaporator (not shown). Accumulator 18 also includes conical end wall 28, having tubular portion 30 and inlet aperture 32. Although the accumulator in the embodiment shown has conical end walls 22, 28, it will be appreciated that end walls having other configurations may be substituted without departing from the scope of the invention. Similarly, end walls 22, 28 may be flat. A first end portion 33 of a suction tube 34 extends into accumulator 18 through aperture 32, as shown in FIG. 1. Suction tube 34 also includes a bend or elbow portion 37 whereby second end portion 35 of suction tube 34 extends at substantially right angles to first end portion 33. Second end portion 35 extends into compressor 10 through an inlet aperture 36 formed on compressor housing 12. End portion 35 is secured to housing 12 by means of suction inlet adaptor 38.

Figure 3:
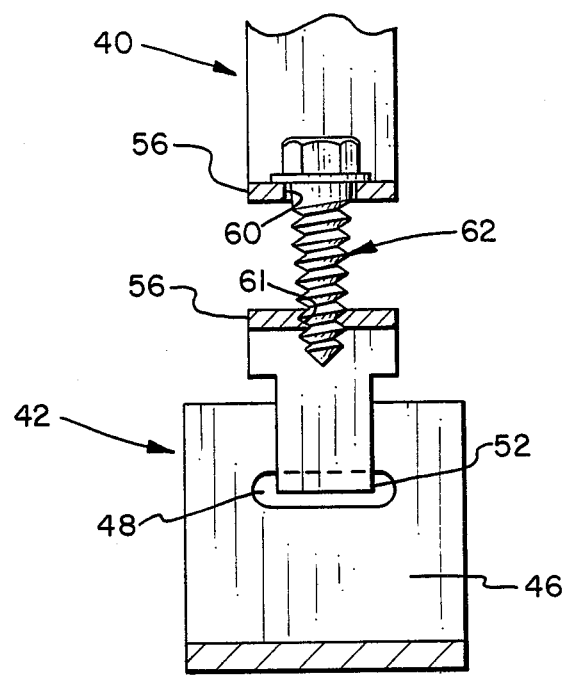
FIG. 3 is an enlarged sectional view taken along line 3—3 of FIG. 2.

A housing bracket 42 is affixed to compressor housing 12, as best shown in FIG. 2. In a preferred mode, housing bracket 42 is formed from cold rolled steel and is spot welded to housing 12 along two end sections 44. Intermediate sections 46 of bracket 42 have apertures 48 formed therein, as shown in FIG. 3. A central arcuate cradle 50 is provided on bracket 42 to define a seat for accumulator cylindrical casing 20. A unitary accumulator strap 40 is provided to hold accumulator 18 to cradle portion 50 as shown in FIG. 2. Strap 40 is disposed circumferentially around accumulator casing 20, and includes hook portions 52 that are fitted within apertures 48 of housing bracket 42. Strap 40 includes a spring loop 54. In a preferred mode, spring loop 54 has opposite sides 56 disposed generally parallel to each other and connected by end portion 58. Sides 56 have holes 60 and 61 axially aligned and adapted to receive retaining means 62. In the embodiment shown, retaining means 62 comprises a screw which passes through a clearance hole 60 in one of said sides 56, and extends to the other of said sides 56 where it is threadedly received in hole 61.

By way of example screw 62 may be a self-tapping screw formed from cold rolled steel having a zinc-plated finish. The threaded portion of said screw extends for a distance of approximately 0.595 inch to 0.625 inch from the head portion of the screw 62. Strap 40 is also formed from cold rolled steel having a zinc-plated finish and is somewhat resilient. Strap 40 has a width of approximately 0.510 inch and a thickness of approximately 0.055–0.065 inch. The radius of the circumferential portion of strap 40 is approximately 1.120 inches. Opposite sides 56 of spring loop 54 are spaced apart approximately 0.318 inch. The diameter of accumulator casing 20 is in the range of 2 to 2½ inches, and the entire assembly is extremely compact.

During operation of the compressor and accumulator assembly, accumulator 18 is subject to vibrations. The vibrations impart and undesirable noise level to the assembly and may cause a weakening of the mount of accumulator 18 to compressor 10. Strap 40 is attached to housing bracket 42 by hooks 52. The tension of strap 40 may be increased by constricting opposing sides 56 of spring loop 54. This is accomplished by turning screw 62 in a clockwise direction, which results in a shortening of the distance between opposing sides 56. This action imparts a spring tension to strap 40, and tightens the connection of accumulator casing 20 with cradle 50 of housing bracket 42. The spring tension on screw 62 prevents it from loosening due to vibrations. Thus, accumulator 18 is firmly held in a closely spaced relationship with compressor 10.

While this invention has been described as having a preferred design, it will be understood that it is capable of further modification. This application therefore intended to cover any variations, uses or adaptations of the invention following the general principals thereof and including such departures from the present disclosure as come within known or customary practice in the art to which this invention pertains and fall within the limits of the appended claims.

What is claimed is:

1. In combination, a hermetic compressor having a housing, said housing having retaining means disposed thereon;

an accumulator positioned adjacent the housing in closely spaced relationship therewith, said accumulator having an outer casing;

strap means disposed circumferentially around said accumulator casing and fastened to said retaining means, said strap means having an integral spring loop portion formed therein for establishing spring tension at the engagement of said strap means and said retaining means; and means for compressing said spring loop portion for varying said spring tension whereby said accumulator is resiliently clamped to said housing.

2. The combination as claimed in claim 1, wherein said strap means includes hook means for engaging said retaining means.

3. The combination as claimed in claim 2, wherein said retaining means comprises a bracket affixed to said compressor housing, said bracket including at least one aperture adapted to receive said hook means 4. The combination as claimed in claim 3, wherein said accumulator is clamped in direct engagement with said bracket by said strap means.

5. The combination as claimed in claim 1, wherein said spring loop is disposed radially outwardly from a circumferential portion of said strap means, said spring loop further having opposing sides spaced a predetermined distance and disposed generally parallel to each other, and including means for varying said predetermined distance between said opposing sides whereby the tension between said strap means and said retaining means may be adjusted.

6. The combination as claimed in claim 5, wherein each of said spaced opposing sides has a hole disposed therein, said holes being axially aligned, and wherein said means for varying the predetermined distance between said opposing sides comprises screw means received in each of said holes and operatively adapted to constrict said opposing sides 7. The combination as claimed in claim 6, wherein said screw means comprises a self-tapping screw threadedly received in one of said holes.

8. The combination as claimed in claim 5, wherein said strap means is formed of cold rolled steel and wherein said predetermined distance is 0.318 inch 9. The combination as claimed in claim 1, wherein said strap means further comprises a generally semi-circular body, said body having said spring loop extending radially outwardly from said semi-circular body.

10. In combination, a hermetic compressor having a housing, said housing having retaining means disposed thereon;

an accumulator positioned axially parallel to said housing and in closely spaced relationship therewith, said accumulator having a cylindrical casing; and strap means disposed circumferentially around a portion of said accumulator casing and fastened to said retaining means, said strap means having an integral spring loop portion formed therein for establishing tension at the engagement of the strap means and the retaining means, and including means for compressing said loop portion for adjusting said tension, whereby the accumulator is securely held by said strap means in closely spaced relationship with said compressor housing.

11. The combination as claimed in claim 10, wherein said strap means includes hook means for engaging said retaining means.

12. The combination as claimed in claim 11, wherein said retaining means comprises a bracket affixed to said compressor housing, said bracket including at least one aperture adapted to receive said hook means.

13. The combination as claimed in claim 12, wherein said accumulator is clamped in direct engagement with said bracket by said strap means.

14. The combination as claimed in claim 10, wherein said spring loop is disposed radially outwardly from a circumferential portion of said strap means.

15. The combination as claimed in claim 14, wherein said spring loop has opposing sides spaced apart a predetermined distance and disposed generally parallel to each other, said spring loop further having means for varying said predetermined distance between said opposing sides whereby the tension between said strap means and said retaining means may be adjusted.

16. The combination as claimed in claim 15, wherein each of said spaced opposing sides has a hole disposed therein, said holes being axially aligned, and wherein said means for varying the predetermined distance between said opposing sides comprises screw means received in each of said holes and operatively adapted to constrict said opposing sides.

17. The combination as claimed in claim 16, wherein said screw means comprises a self-tapping screw threadedly received in on of said holes.

18. The combination as claimed in claim 15, wherein said strap means is formed of cold rolled steel and wherein said predetermined distance is 0.318 inch.

19. The combination as claimed in claim 10, wherein said strap means further comprises a generally semi-circular body, and wherein said spring loop extends radially outwardly from said semi-circular body.

* * * * *